United States Patent
Schöning

(10) Patent No.: US 9,189,255 B2
(45) Date of Patent: Nov. 17, 2015

(54) SYSTEM AND METHODS FOR GENERATING RUNTIME MESSAGES

(75) Inventor: Harald R. Schöning, Dieburg (DE)

(73) Assignee: Software AG, Darmstadt (DE)

( * ) Notice: Subject to any disclaimer, the term of this patent is extended or adjusted under 35 U.S.C. 154(b) by 1705 days.

(21) Appl. No.: 11/672,730

(22) Filed: Feb. 8, 2007

(65) Prior Publication Data

US 2008/0281850 A1    Nov. 13, 2008

(30) Foreign Application Priority Data

Jul. 21, 2006   (EP) ..................................... 06015245

(51) Int. Cl.
  *G06F 17/30* (2006.01)
  *G06F 9/44* (2006.01)
  *G06F 9/445* (2006.01)
  *G06F 15/16* (2006.01)

(52) U.S. Cl.
  CPC .......... *G06F 9/4448* (2013.01); *G06F 9/44536* (2013.01)

(58) Field of Classification Search
  USPC ................................................. 707/791, 793
  See application file for complete search history.

(56) References Cited

U.S. PATENT DOCUMENTS

| | | | |
|---|---|---|---|
| 5,898,872 A * | 4/1999 | Richley | 717/121 |
| 6,847,999 B1 | 1/2005 | Dodrill et al. | |
| 6,952,800 B1 | 10/2005 | Danner et al. | |
| 2002/0194181 A1* | 12/2002 | Wachtel | 707/10 |
| 2003/0055808 A1 | 3/2003 | Bhat | |
| 2004/0044704 A1* | 3/2004 | Lee et al. | 707/203 |
| 2004/0221261 A1* | 11/2004 | Blevins | 717/107 |
| 2005/0038832 A1* | 2/2005 | Feigenbaum | 707/202 |
| 2005/0050059 A1* | 3/2005 | Van Der Linden et al. | 707/100 |
| 2005/0055631 A1 | 3/2005 | Scardina et al. | |
| 2005/0097565 A1 | 5/2005 | Klein | |
| 2005/0246423 A1* | 11/2005 | Starbuck et al. | 709/206 |
| 2006/0047499 A1 | 3/2006 | Chen et al. | |
| 2007/0044069 A1* | 2/2007 | Doucette et al. | 717/106 |
| 2007/0168849 A1* | 7/2007 | Bell et al. | 714/799 |

OTHER PUBLICATIONS

European search report for application No. EP 06 01 5245.

* cited by examiner

*Primary Examiner* — Alex Gofman

(74) *Attorney, Agent, or Firm* — Meyertons Hood Kivlin Kowert & Goetzel, P.C.; Jeffrey C. Hood; Mark S. Williams

(57) ABSTRACT

A method for generating a runtime message of an application (20) comprising the steps of generating a unique message identification for the runtime message, generating a message content, providing an XML repository (30), which stores the unique message identification and the message content in an XML format and including a call for the message in the application (20) using the unique message identification so that the XML repository (30) is accessed during runtime for display of the message content.

16 Claims, 4 Drawing Sheets

Could not initialize TCP stack

Figure 3:
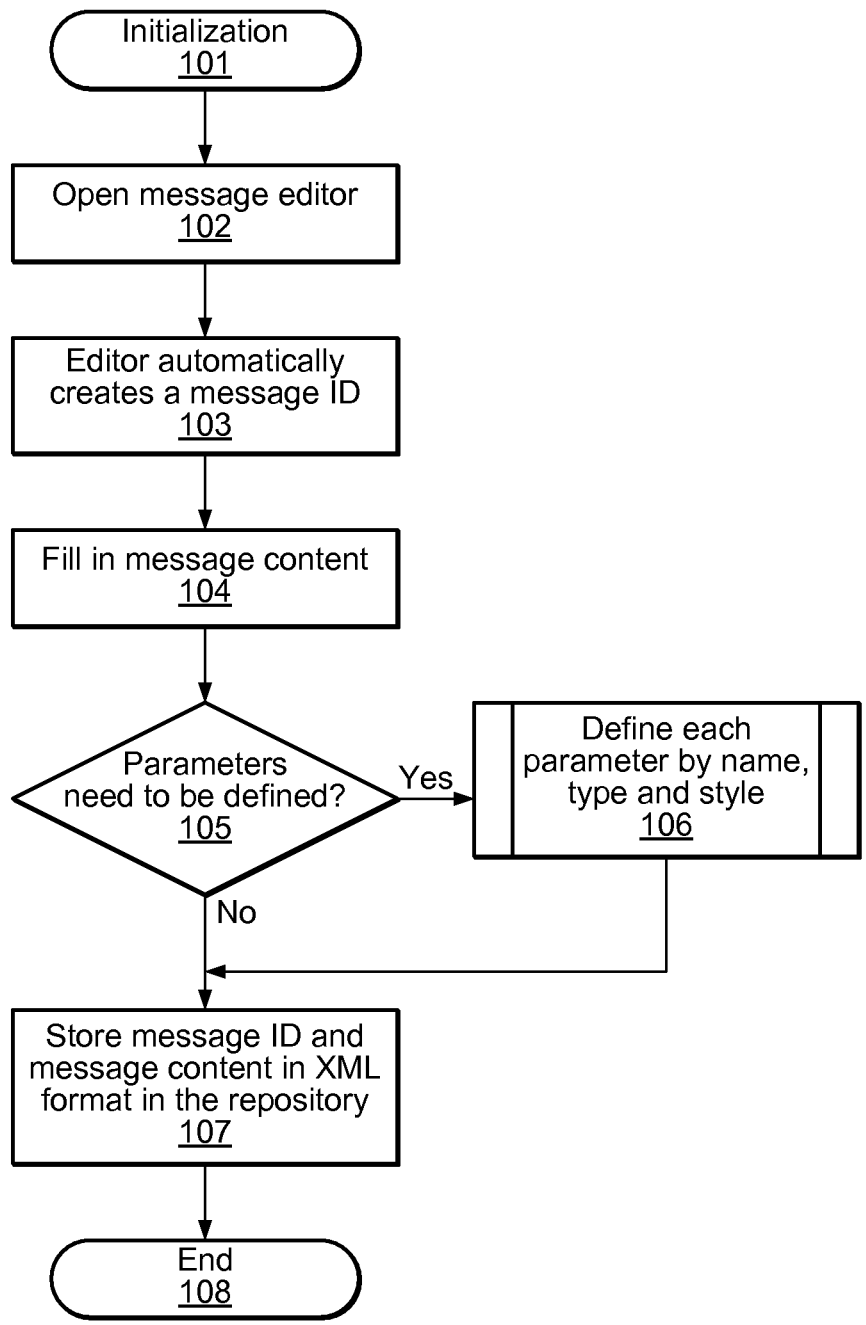

FIG. 1A
(PRIOR ART)

| | |
|---|---|
| Explanation | This is an internal error in the event logging protocol. The communication between a logging client and the logging server could not be established. Basic functions and commands may be unaffected by this failure but messages will not be stored permanently or displayed in the Tamino Manager browser interface. |
| Action | This failure is most likely due to extreme shortage of resources, or missing operating system components. Check the disk space. Check the integrity of the installation. Contact your software supplier to check if there is a software update. |

FIG. 1B
(PRIOR ART)

Starting database "welcome_4_4_1"

FIG. 1C
(PRIOR ART)

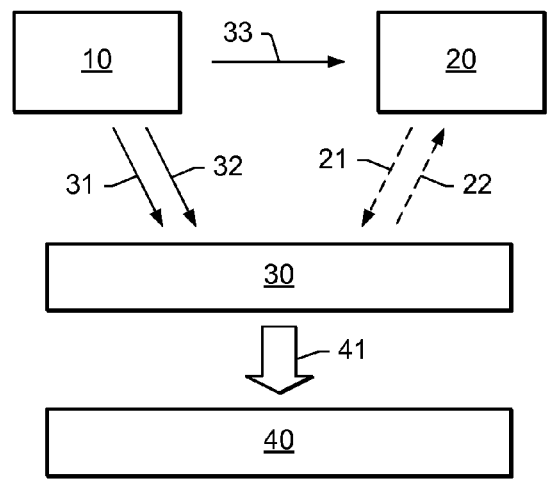

FIG. 2

SYSTEM AND METHODS FOR GENERATING RUNTIME MESSAGES

PRIORITY CLAIM

This application claims benefit of priority of European application no. EP 06015245.1 titled "System and Methods for Generating Runtime Messages", filed Jul. 21, 2006, and whose inventor is Harald R. Schoning.

INCORPORATED BY REFERENCE

European application no. EP 06015245.1 titled "System and Methods for Generating Runtime Messages", filed Jul. 21, 2006, and whose inventor is Harald R. Schoning, is hereby incorporated by reference in its entirety as though fully and completely set forth herein.

TECHNICAL FIELD

The present invention relates to a system and method for generating a runtime message of an application and a consistent documentation thereof.

THE PRIOR ART

Providing messages for a user during runtime is essential for a technically correct operation of almost any application. The messages may for example instruct a user at runtime how to address an error or inform about the progress of an operation performed by the application. In another example, a control action over a network, such as starting a server, will result in one or more messages being presented to a user. Typically, such a message consists of a single line of text, or very few lines of text. An example of such a message is shown in FIG. 1a.

However, some situations, in particular error situations, might require more detailed technical explanations of the situation and proposals for remedying actions, which do not fit the short format of a message to be displayed during execution of the program. In case of a failure, the user typically needs to know more, i.e. what when wrong and why. Hence, it is common practice in the prior art to include messages, their explanations, and recommended actions into the user documentation. FIG. 1b presents an example of such a documentation for the error message of FIG. 1a. As can bee seen, the documentation serves in this example to further explain the short message "Could not initialize TCP stack" and provides some suggestions how to overcome this technical problem.

The developer creating the program which displays the message at runtime, is typically not the same person as the documentor, who is responsible for the documentation of the program. As a consequence, messages may not be documented at all because the developer does not tell the documentor about the message or the displayed and the documented message text differ. Furthermore, the documented explanation and the proposed actions may be technically inappropriate because they no longer fit to the program as developed by the developer. Finally, the message might be written in a language, which a user of the program cannot understand so that the information provided for example how to overcome technical difficulties with a software or a computer system is useless and cannot contribute to resolve the problem.

In the prior art it is known to provide property files, as they are known specifically for JAVA programs, which contain different language versions for the text of a runtime message. Using variables, the program can decide at runtime, which language version is to be displayed. However, the property files do not address the problem of synchronizing the detailed documentation for runtime messages. In fact, whereas the message itself is due to the above described possibilities of JAVA property files sometimes presented in a translated language, the documentation may not have been translated. This is another reason, why the documentation of a runtime messages is often found not to be synchronized with the message itself. As a result, it might be very hard for a user to overcome technical difficulties related to the execution of a program, based only on the short runtime messages and/or inconsistent documentation.

Furthermore, it is generally known that messages can be parameterized. For example in the short message shown in FIG. 1c the name of the database "welcome_4_4_1" is such a parameter. Parameters can have a format which depends on the language of the message using the parameter. For example the format for indicating a date is different in German and in English. If there is more than one parameter also the sequence of the display of the parameters in a runtime message may vary in different languages. This is particularly a problem, if a server is running a program in a certain language environment, which generates a message for multiple clients looking at this message, each client running in a different language environment. The clients should be able to see the same message, however, in their respective language, even if the sequence of message parameters has changed due to translation.

It is therefore the technical problem underlying the present invention to provide a system and methods which overcome at least some of the above outlined disadvantages of the prior art and which facilitate the presentation of technically correct information concerning the execution of a program in both, the presented runtime messages and the related technical documentation.

SUMMARY OF THE INVENTION

In one aspect of the invention, this problem is solved by a method for generating a runtime message of an application comprising the steps of generating a unique message identification for the runtime message, generating a message content, providing an XML repository, which stores the unique message identification and the message content in an XML format and including a call for the message in the application using the unique message identification so that the XML repository is accessed during runtime for display of the message content.

Storing the message content in the XML message repository provides a XML database for each message of the application, which can be easily accessed by means of its unique message identification. Rather than having to work through a complicated source code to identify each message, a documentor can thus access the XML repository of the present invention to identify each message of the application and to provide appropriate explanations and instructions how to address issues such as technical difficulties occurring during the execution of an application. The source code contains only the call using the unique message identification and is therefore independent of the content of the message or its specific output format. The XML repository and its population with message contents according to the invention therefore facilitate the task to provide a technically complete and synchronized documentation for the application.

Preferably, the message content comprises at least one parameter, wherein the call for the message comprises preferably a value for the parameter and wherein a name, a type and preferably a style of each parameter are stored in the XML repository. If several parameters are used, for example to reflect a date in a message, they can be uniquely identified, even if their sequence changes.

In one embodiment, the method further comprises the steps of generating at least two different versions of the message content related to a single message identification in the XML repository for being selected for display during runtime depending on at least one runtime condition of the application. This may be particularly advantageous, if the application is a database application executable on a client and wherein the XML repository is provided on a database server connected to the client. In this case, it is preferred, if at least two different versions of the message content are stored in the XML repository to be selectable for display by different clients, for example clients running the database application in a different language environment.

According to a further aspect, the present invention concerns a method for generating messages during runtime of an application comprising the steps of executing a call to an XML repository, the call including a unique message identification, receiving a message content related to the unique message identification from the XML repository and displaying the message content to a user. The call to the XML repository comprises preferably a value for at least one parameter.

Therefore, the XML repository of the invention is accessed at least twice: Once during the development stage, when new message contents are stored and related to the respective unique messages identification and for a second time during runtime, when the application executes a call using the message identification to display the retrieved message content.

Preferably, different versions of the message content stored in the XML repository and related to the same message identification are received, depending on a runtime condition, for example the indication of a certain language environment.

According to a still further aspect, the present invention concerns a system for generating a runtime message of an application comprising an editor, which automatically generates a unique message identification for the runtime message and which is adapted to generate a message content, and an XML repository for storing the unique message identification and the related message content in an XML format. The system may, for example, be part of a general development environment for new applications.

Preferably, the system comprises means for including a call for the message in the application using the unique message identification so that the XML repository is accessed during runtime for display of the message, wherein the message content stored in the XML repository comprises at least one parameter. For example, the call of the message included in the application may be comprised in a routine defining the number and types of values for one or more parameters. Such a routing, e.g. a macro in C code, assures that parameter values included in the call to the XML repository have the correct format.

In one embodiment, the XML repository of the system further comprises at least one further version of the message content related to the same message identification and adapted to be selected for display during runtime depending on at least one runtime condition of the application. For example, if the application is a database application executable on at least a first and a second client, the XML repository is preferably adapted to store a first and a second version of the message content to be received by the first and the second client, respectively.

Finally, the present invention relates to an application comprising runtime messages, in particular error messages, generated with a system as described above.

Further advantageous modifications of embodiments of the system and the methods of the invention are defined in further dependent claims.

SHORT DESCRIPTION OF THE DRAWINGS

Figure 4:
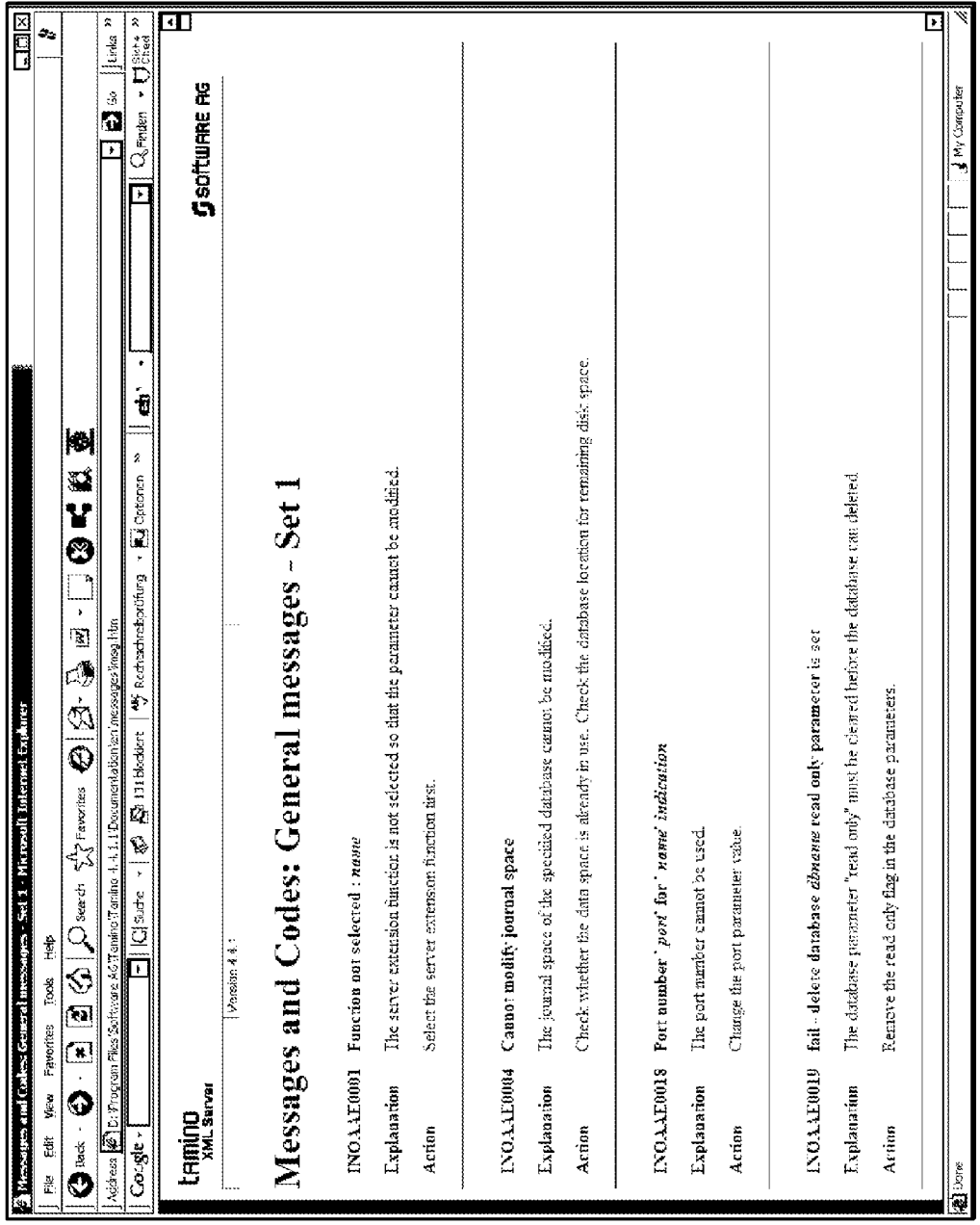

In the following detailed description presently preferred embodiments of the invention are further described with reference to the following figures:

FIG. 1a: An exemplary runtime message;

FIG. 1b: The documentation for the runtime message of FIG. 1a;

FIG. 1c: A parameterized runtime message;

FIG. 2: A simplified overview of the system for generating runtime messages in accordance with an embodiment of the invention;

FIG. 3: A flow chart illustrating the steps performed during development time for generating runtime messages of an application;

FIG. 4: An example of a simple documentation generated from an XML repository; and FIG. 5: A flow chart illustrating the steps performed during runtime for generating the runtime messages.

DETAILED DESCRIPTION OF PREFERRED EMBODIMENTS

FIG. 2 presents an overview of the various elements of a presently preferred embodiment of a system in accordance with the present invention. An XML repository 30 is provided, which is populated with message contents and unique message identifications. In FIG. 2, data communication from and to the XML repository 30 during development time is illustrated by the continuous arrows 31, 32, whereas the dashed arrows 21, 22 indicate data communication during runtime.

As shown in FIG. 2, there is an editor or a similar development tool 10, which communicates with the repository 30 during development time and which serves to create parts of an application 20 for accessing the XML repository 30 during runtime. The editor 10 may be part of a greater development environment including other typical development function such as debugging etc. (not shown). Further, a documentation 40 is additionally provided, which is also based on the XML repository 30, as indicated by the arrow 41. The step of deriving the documentation 40 based on the XML repository 30 may be separate from the creation of the application 20 and occur at any time.

The system schematically shown in FIG. 2 is used to generate runtime messages of the application 20, as explained in the following with respect to the flowchart of FIG. 3:

After initialization in step 101, the message editor 10 is opened in step 102. In step 103, the editor 10 automatically creates a unique message ID. In step 104, the message content is filled in comprising text and/or graphics and/or audio and/or video information. A simple example is shown in FIG. 1a. In case of a more complicated message, one or more parameters need to be defined. If this is the case (step 105), each parameter is defined in step 106 by its parameter name, type and style.

Indicating a style for a parameter will influence its display during runtime. A style may for example cause the name of a database to be presented with quotation marks to distinguish it from the rest of the message. Since the styles are also stored in the XML repository, they can be easily adapted, for example for the output in different languages.

Finally, the message ID and the message content are both stored in an XML format in the repository 30 in step 107 before the end 108 of the message generating process is reached. However, the message ID and the corresponding message content or even parts thereof may also be separately stored in the repository as reflected by the separate arrows 31 and 32 in FIG. 2.

In the following an example of an entry is presented, as it can be found in the XML repository after the steps 101 to 108 have been performed:

```
<message-info id="INOAAE0019" switch="show" developer="kh">
<message>
<mess-id>INOAAE0019</mess-id>
<mess-text>
fail - delete database
<realval name="dbname" style="databaseName" type="str" />
<placeholder>database name</placeholder>
read only parameter is set
</mess-text>
</message>
<mess-add>
<mess-comment>errorType</mess-comment>
</mess-add>
<mess-expl>
<title>Explanation</title>
<p>The database parameter "read only" must be cleared before the
    database can deleted.</p>
</mess-expl>
<action>
<title>Action</title>
<p>Remove the read only flag in the database parameters.</p>
</action>
</message-info>
```

As can be seen, a message ID and a message content concerning the failure to delete a database have been stored in the format of the XML repository. Further, the message content involves the parameter having the name "dbname", which is a string and which is to be displayed according to the style "databaseName", when the message is presented to a user during runtime. In the documentation it will be displayed as "database name".

However, the XML repository 10 may not only store a single version of the message content relating to a certain message ID. On the contrary, there may be a plurality of entries under the same message ID. For example, the above shown message content may additionally be stored in another language, such as German:

```
<message-info id="INOAAE0019" switch="show" developer="kh">
<message>
<mess-id>INOAAE0019</mess-id>
<mess-text>
Löschen der Datenbank
<realval name="dbname" style="databaseName" type="str" />
<placeholder>Datenbankname</placeholder>
ist fehlgeschlagen - Parameter read only war gesetzt
</mess-text>
</message>
<mess-add>
<mess-comment>errorType</mess-comment>
</mess-add>
<mess-expl>
<title>Erklärung</title>
<p>Der Datenbankparameter "read only" muss ausgeschaltet werden,
    bevor die Datenbank gelöscht werden kann.</p>
</mess-expl>
<action>
<title>Abhilfe</title>
<p>Schalten Sie den Datenbankparameter "read only" ab und löschen Sie
  erneut.</p>
</action>
</message-info>
```

In addition to different languages, the message content may also vary for other reasons. For example in case of a modular database application, wherein several clients running the application 20 access a common database server, not all clients may be able or authorized to perform the same functions. This may in turn determine the content of a runtime message to be displayed. For example suggested actions to resolve an error may depend on the functions available to the client displaying the message. The above explained XML repository significantly facilitates the managing of different versions of message contents referenced with the same message ID.

As shown by the arrow 33 in FIG. 2, the editor 10 generates preferably also sections of code to be inserted into the application 20 for calling the message based on its ID during runtime. In the following, an exemplary macro (in C language) is shown, which assures that the call of the message provides a value for the parameter "dbname" which is in agreement with its type:

```
#define M__INOAAE0019 "INOAAE0019"          /* fail - delete
database %dbname% read only parameter is set */
#define E__INOAAE0019(__caller__event__token, dbname) \
{ \
    MF__PARDESC__T parms[ ] = { \
        { "dbname", "STRING__STYLE__DBNAME", CE__NULL,
PARTYPE__CSTR, CE__NULL, 0, 0 } \
    }; \
    *(const char **)&parms[0].mfp__value = dbname; \
    WriteMessageEx(__caller__event__token, SV__ERROR,
INO__MESSAGE__FILE__NAME, M__INOAAE0019, 1, parms); \
}
```

If the application 20 provides a parameter value, which is not in agreement with the defined parameter type, an error message will be caused already during compilation of the new application and not only during runtime.

Another example of a C macro is shown below involving several parameters:

```
#define M_INODSE2285 "INODSE2285"        /* Creation of %database space%
%space no% (%path%) has failed due to system error %errno% (%errtxt%) */
#define E_INODSE2285(_caller_event_token, database_space, space_no, path, errno,
errtxt) \
{ \
    MF_PARDESC_T parms[ ] = { \
        { "database space", "STRING_STYLE_DATABASE_SPACE", CE_NULL,
PARTYPE_COPY, CE_NULL, 0, 0 }, \
        { "space no", "INTEGER_STYLE_DATABASE_SPACE_NUMBER",
CE_NULL, PARTYPE_UNSIGNED16, CE_NULL, 0, 0 }, \
        { "path", "STRING_STYLE_PATHNAME", CE_NULL, PARTYPE_CSTR,
CE_NULL, 0, 0 }, \
        { "errno", CE_NULL, CE_NULL, PARTYPE_SIGNED32, CE_NULL, 0, 0 }, \
        { "errtxt", CE_NULL, CE_NULL, PARTYPE_CSTR, CE_NULL, 0, 0 } \
    }; \
    *(const char **)&parms[0].mfp_value = database_space; \
    *(const CE_UINT2 **)&parms[1].mfp_value = space_no; \
    *(const char **)&parms[2].mfp_value = path; \
    *(const CE_INT4 **)&parms[3].mfp_value = errno; \
    *(const char **)&parms[4].mfp_value = errtxt; \
    WriteMessageEx(_caller_event_token, SV_ERROR,
INO_MESSAGE_FILE_NAME, M_INODSE2285, 5, parms); \
}
```

The naming of the parameters, which are defined in the message content, facilitate the task of the documentor, who needs to understand the significance of each parameter to provide a meaningful documentation. The documentor can also change the displayed name for a parameter without affecting application 20 or any other runtime component.

Further, a parameter may be removed without having to change the code of the application 20, which may only later be modified. This is not possible in the prior art (Java), since reference is made to a relative position of the parameter.

Similar macros or (sub) routines can be used for any other programming language to include a call for the message into the application using the unique message ID.

A further advantage of the XML repository 30 for storing message contents referenced by message IDs is the easy access for generating the documentation for the application 20. FIG. 4 shows a simplified example, wherein the documentation is simply a list of all messages and their respective message contents. If there are related XML files in the repository 30 for different languages, as discussed above, it can be decided at display time, in which language the documentation is to be presented.

Figure 5:
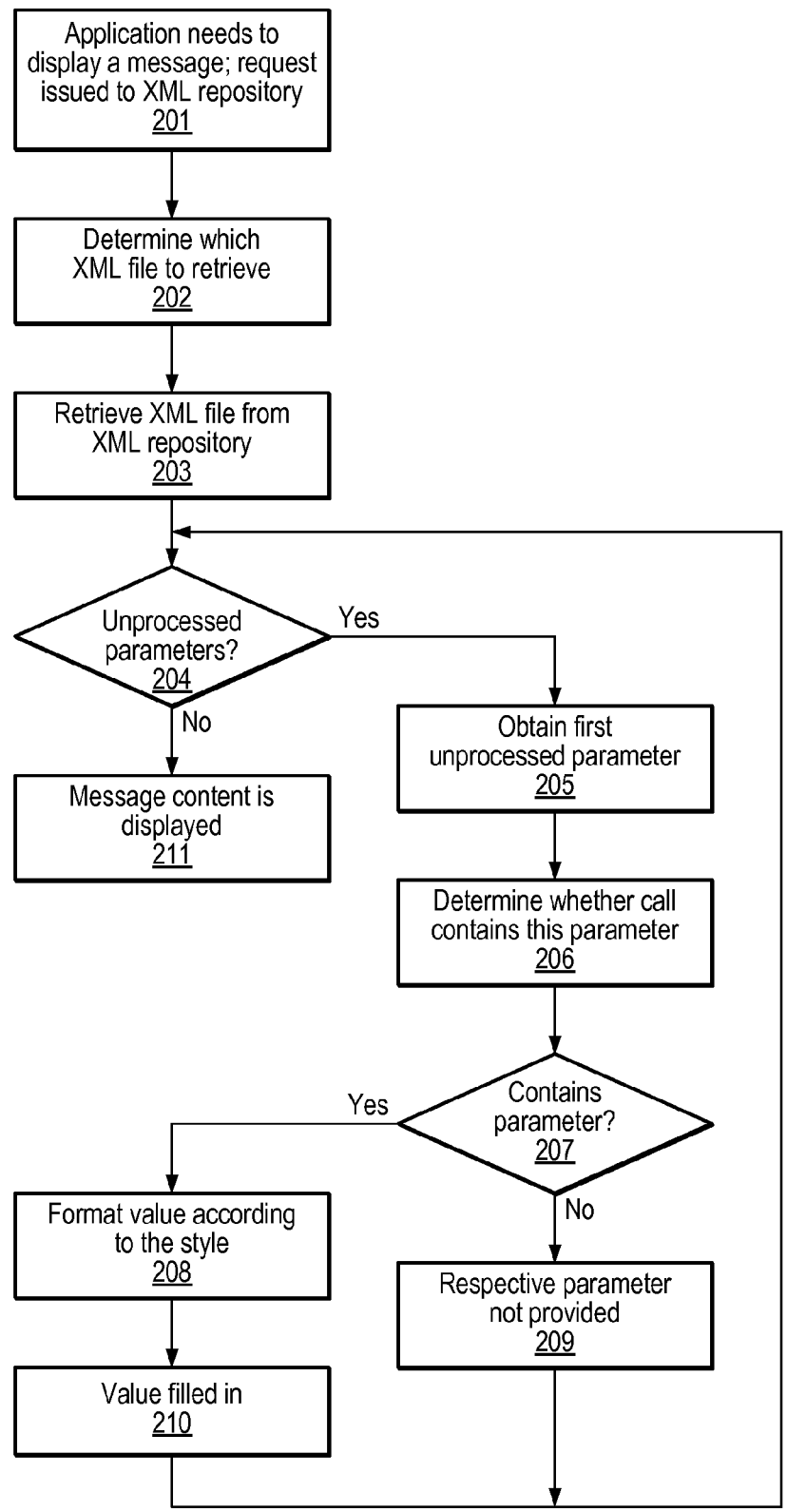

FIG. 5 presents a flowchart illustrating the steps for presenting messages during runtime of the application 20 based on the system of FIG. 2:

In step 201 the application 20 needs to display a message. To this end, a call or request is issued to the XML repository 30 containing the message ID and the values of one or more parameters (cf. also the dashed arrow 22 in FIG. 2). If there are several alternative message contents stored in the XML repository under the same message ID, for example in different languages, a determination must be made in step 202, which XML file is to be retrieved from the XML repository 30. This determination can be made based on a global environmental variable set in the application or outside the application, for example in the XML repository 30.

Once the corresponding XML file is retrieved from the XML repository in step 203, it is processed with regard to parameters. If it is found in step 204 that there are no parameters for a certain message or that all parameters have already been processed, the message content is displayed in step 211. Otherwise, the first unprocessed parameter is obtained from the retrieved XML file in step 205. In step 206, it is checked whether also the input, i.e., the call from the application 20, contains this parameter. If so (step 207), its value is formatted in step 208 according to the style, which is preferably also stored in the XML repository. In step 210 the value is filled in and the processing continues with the next parameter of the message. If the input, i.e., the call from the application 20, does not contain this parameter in 207, then the parameter is left out or not provided. After all parameters have been processed, the message content is returned to the application for display in step 211 together with the formatted parameter values (cf also the dashed arrow 22 in FIG. 2).

As a result, the whole message displaying process during runtime is driven by the XML files stored for the various messages in the XML repository 30. Since the documentation 40 accesses the same XML repository 30 (see above), synchronization between the runtime messages and the respective documentation 40 can be easily assured.

The invention claimed is:

1. A method for generating a runtime message of an application, comprising:
   utilizing a computer to perform:
   a. creating at development time a unique message identification for the runtime message;
   b. generating at development time a message content;
   c. providing an XML repository, which, at development time, stores the unique message identification and the message content in an XML format, wherein the message content comprises at least one parameter designated in the message content by a descriptive name, and wherein the XML repository is separate and distinct from the application;
   d. including, at development time, a call for the message in the application using the unique message identification so that the XML repository is accessed during runtime for display of the message content, wherein the call for the message is configured to provide a value for the at least one named parameter at runtime; and
   e. deriving external documentation for the runtime message based on the XML repository, wherein the external documentation comprises:
      the message content, including the one or more parameter names; and
      an explanation of the runtime message.

2. The method of claim 1, wherein a type and/or a style of each parameter are stored in the XML repository.

3. The method of claim 2, wherein the call of the message included in the application is comprised in a routine defining the number and types of values for the one or more parameters.

4. The method of claim 1, further comprising the step of:
generating at least two different versions of the message content related to a single message identification in the XML repository for being selected for display during runtime depending on at least one runtime condition of the application.

5. The method of claim 4, wherein the application is a database application executable on a client and wherein the XML repository is provided on a database server connected to the client.

6. The method of claim 5, wherein the at least two different versions of the message content are stored in the XML repository to be selectable for display by different clients.

7. A method for generating messages during runtime of an application, comprising:
utilizing a computer to perform:
  a. executing, during runtime, a call to an XML repository, the call including a unique message identification, wherein the call is configured to provide a value for at least one named parameter in a message corresponding to the unique message identification at runtime, and wherein the XML repository is separate and distinct from the application;
  b. receiving, during runtime, message content related to the unique message identification from the XML repository;
  c. displaying, during runtime, the message content to a user, wherein the message content comprises the provided value for the at least one named parameter; and
  d. wherein the XML repository provides access for generating external documentation for the application, wherein the external documentation comprises:
    the message content, including the at least one parameter's name; and
    an explanation of the message content.

8. The method of claim 7, wherein different versions of the message content stored in the XML repository and related to the same message identification are received, depending on a runtime condition.

9. The method of claim 8, wherein the application is a database application executed on a client and wherein the XML repository is provided on a database server connected to the client.

10. The method of claim 9, wherein different versions of the message content are received by different clients.

11. The method of claim 7, wherein the message is an error message displaying instructions how to resolve an error occurred during execution of the application.

12. A system memory medium comprising program instructions for generating a runtime message of an application, the memory medium comprising:
  a. an editor automatically generating a unique message identification for the runtime message and adapted to generate message content;
  b. a XML repository, for storing the unique message identification and the related message content in an XML format, wherein the message content comprises at least one parameter designated in the message content by a descriptive name, and wherein the XML repository is separate and distinct from the application; and
  c. external documentation that is synchronized with the runtime message by being derived based on the XML repository, wherein the external documentation comprises:
    the message content, including the one or more parameter names; and
    an explanation of the runtime message.

13. The system memory medium of claim 12 further comprising means for including a call for the message in the application using the unique message identification so that the XML repository is accessed during runtime for display of the message.

14. The system memory medium of claim 12, wherein the message content stored in the XML repository comprises a type and/or a style of each parameter stored in the XML repository.

15. The system memory medium of claim 12, wherein the XML repository further comprises:
at least one further version of the message content related to the same message identification and adapted to be selected for display during runtime depending on at least one runtime condition of the application.

16. The system memory medium of claim 12, wherein the application is a database application executable on at least a first and a second client and wherein the XML repository is adapted to store a first and a second version of the message content to be received by the first and the second client, respectively.

* * * * *